United States Patent
Chaudhury et al.

(10) Patent No.: US 12,217,191 B2
(45) Date of Patent: Feb. 4, 2025

(54) LEARNING UNPAIRED MULTIMODAL FEATURE MATCHING FOR SEMI-SUPERVISED LEARNING

(71) Applicant: INTERNATIONAL BUSINESS MACHINES CORPORATION, Armonk, NY (US)

(72) Inventors: Subhajit Chaudhury, Kawasaki (JP); Daiki Kimura, Tokyo (JP); Gakuto Kurata, Tokyo (JP); Ryuki Tachibana, Setagaya-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1061 days.

(21) Appl. No.: 17/109,550

(22) Filed: Dec. 2, 2020

(65) Prior Publication Data
US 2022/0172080 A1 Jun. 2, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ......... G06N 5/04; G06N 20/00; G06N 3/0895
See application file for complete search history.

(56) References Cited

U.S. PATENT DOCUMENTS

| | | | |
|---|---|---|---|
| 8,793,283 B1 * | 7/2014 | Austern | G06F 16/27 707/798 |
| 9,633,282 B2 | 4/2017 | Sharma et al. | |
| 10,467,274 B1 * | 11/2019 | Ren | G06N 3/006 |
| 10,885,111 B2 | 1/2021 | Chaudhury et al. | |
| 11,238,362 B2 | 2/2022 | Jin et al. | |
| 2003/0174881 A1 * | 9/2003 | Simard | G06V 10/454 382/159 |
| 2016/0093048 A1 | 3/2016 | Cheng et al. | |

(Continued)

FOREIGN PATENT DOCUMENTS

| CN | 106980867 A | 7/2017 |
|---|---|---|
| CN | 110390401 A | 10/2019 |

OTHER PUBLICATIONS

Liwei Wang, Alexander G. Schwing, and Svetlana Lazebnik, Diverse and Accurate Image Description Using a Variational Auto-Encoder with an Additive Gaussian Encoding Space, 2017, University of Illinois at Urbana-Champaign (Year: 2017).*

(Continued)

*Primary Examiner* — Li Wu Chang
(74) *Attorney, Agent, or Firm* — Tutunjian & Bitetto, P.C.; Robert Richard Aragona (57) ABSTRACT

A computer-implemented method is provided for learning multimodal feature matching. The method includes training an image encoder to obtain encoded images. The method further includes training a common classifier on the encoded images by using labeled images. The method also includes training a text encoder while keeping the common classifier in a fixed configuration by using learned text embeddings and corresponding labels for the learned text embeddings. The text encoder is further trained to match a distance of predicted text embeddings which is encoded by the text encoder to a fitted Gaussian distribution on the encoded images.

25 Claims, 10 Drawing Sheets

(56) References Cited

U.S. PATENT DOCUMENTS

| | | | |
|---|---|---|---|
| 2016/0313463 A1* | 10/2016 | Wahrmund | G01V 1/30 |
| 2019/0018933 A1 | 1/2019 | Oono et al. | |
| 2019/0232964 A1* | 8/2019 | Lindholm | G06V 20/58 |
| 2019/0279074 A1* | 9/2019 | Lin | G06F 16/583 |
| 2019/0377987 A1* | 12/2019 | Price | G06N 3/045 |
| 2020/0106805 A1* | 4/2020 | Gronát | G06N 3/084 |
| 2020/0234086 A1 | 7/2020 | Taha et al. | |
| 2020/0334809 A1* | 10/2020 | Vianu | G06V 30/1916 |

OTHER PUBLICATIONS

Haleh Akrami, Anand A. Joshi, Jian Li, Sergul Aydore, and Richard M. Leahy, Robust Variational Autoencoder, 2019, NeurIPS (Year: 2019).*
Chen et al. "UNITER: UNiversal Image-Text Representation Learning", arXiv:1909.11740v3 [cs.CV] Jul. 17, 2020, pp. 26.*
International Search Report issued in PCT Application No. PCT/CN2021/128077, Dated Jan. 28, 2022, pp. 1-9.
Guo, Longteng, et al. "Mscap: Multi-style image captioning with unpaired stylized text," InProceedings of the IEEE/CVF Conference on Computer Vision and Pattern Recognition. Jun. 2019, pp. 4204-4213.
Baruch et al., "Multimodal matching using a Hybrid Convolutional Neural Network", arXiv:1810.12941v2 [cs.CV] Dec. 18, 2019, pp. 1-12.
Chaudhury et al., "Conditional generation of multi-modal data using constrained embedding space mapping", arXiv:1707.00860v2 [cs.LG] Jul. 26, 2017, 7 pages.
Du et al., "Doubly Semi-Supervised Multimodal Adversarial Learning for Classification, Generation And Retrieval", IEEE Explore, Aug. 2019, 6 pages.
Effendi et al., "Listening While Speaking and Visualizing: Improving ASR Through Multimodal Chain", needarXiv:1906.00579v3 [cs.CL] Nov. 14, 2019, 8 pages.
Ma et al., "Multimodal Convolutional Neural Networks for Matching Image and Sentence", ICCV, Dec. 2015, pp. 2623-2631.
Mansimov, et al., "Generating Images from Captions With Attention", arXiv:1511.02793v2 [cs.LG] Feb. 29, 2016, pp. 1-12.
Mell et al. "The NIST Definition of Cloud Computing", NIST Special Publication 800-145, 2011, 7 pages.
Ngiam et al., "Multimodal Deep Learning", ResearchGate, Jan. 2011, 11 Pages.
Rasmus et al., "Semi-Supervised Learning with Ladder Networks", arXiv:1507.02672v2, Nov. 2015, pp. 1-9.
Reed et al., "Generative Adversarial Text to Image Synthesis", feaarXiv:1605.05396v2 [cs.NE] Jun. 5, 2016, 10 pages.
Chaudhury et al., "Text to Image Generative Model Using Constrained Embedding Space Mapping", 2017 IEEE International Workshop On Machine Learning For Signal Processing, Sep. 2017, 6 pages.
Srivastava et al., "Multimodal Learning with Deep Boltzmann Machines", Journal of Machine Learning Research 15 (2014), Sep. 2014, pp. 2949-2980.
Suzuki et al., "Joint Multimodal Learning With Deep Generative Models", ICLR 2017, Apr. 2017, pp. 1-5.
Valindria et al., "Multi-Modal Learning from Unpaired Images: Application to Multi-Organ Segmentation in CT and MRI", 2018 IEEE Winter Conference on Applications of Computer Vision, Feb. 2018, pp. 547-556.

* cited by examiner

LEARNING UNPAIRED MULTIMODAL FEATURE MATCHING FOR SEMI-SUPERVISED LEARNING

BACKGROUND

The present invention generally relates to machine learning, and more particularly to learning unpaired multimodal feature matching for semi-supervised learning.

Generating one data modality from another data modality is an important function in many machine learning applications.

Often, applications involve two or more data modalities where, for each modality, there exists few labeled samples and many unlabeled samples. The goal is to use the labeled samples to learn a common mapping between modalities.

In "Text to Image Generative Model using Constrained Embedding Space Mapping", IEEE International Workshop On Machine Learning For Signal Processing, 2017, by Subhajit Chaudhury et al. and also "Conditional generation of multi-modal data using constrained embedding space mapping", International Conference on Machine Learning (ICML) workshop on Implicit Generative Models, 2017, by Subhajit Chaudhury et al., a deterministic mapping scheme is used where they first compute to force the latent space to be equal during training. Since the latent spaces are deterministic, the deterministic mapping scheme cannot model different variations in multi-modal distributions. Also, the deterministic mapping scheme is prone to overfitting since deterministic mapping provides no measure of maximal decoupling between embeddings and the common latent space. Additionally, they used paired training data.

In "Multimodal deep learning," in Proceedings of the 28th International Conference on Machine Learning (ICML-11), 2011, pp. 689-696, by Jiquan Ngiam et al., a deep learning framework is proposed using restricted Boltzmann machines and deep belief networks to learn efficient features of audio and video modalities. However, they required both modalities for inferring the latent space, which limits conditional generation of data from one modality to another.

In "Generating images from captions with attention," Computing Research Repository (CoRR), Vol. abs/1511.02793, 2015, by Elman Mansimov et al., it is shown that using attention-based models for generating images from text captions results in higher quality samples. However, they could not generate two-way multi-modal data distributions.

In "Generative adversarial text to image synthesis," in Proceedings of the 33rd International Conference on Machine Learning, Vol. 48. 2016, ICML'16, pp. 1060-1069, JMLR.org, by Scott Reed et al., deep convolutional generative adversarial networks are proposed which combined natural language and image embeddings in order to produce synthetically generated images. However, they could only generate only text from images and not the other way around.

In "Joint Multimodal Learning with Deep Generative Models", International Conference on Learning Representations (ICLR) 2017 workshop, Apr. 24-26, 2017, Toulon, France by Masahiro Suzuki et al., joint distribution learning is proposed using variational inference directly on data modalities, by sharing data modalities to create a common latent space. However, their approach cannot be directly used for conditionally independent inference. Moreover, their approach requires more network parameters, uses more data for training, and has to rely on adversarial models for training natural images.

SUMMARY

According to aspects of the present invention, a computer-implemented method is provided for learning multimodal feature matching. The method includes training an image encoder to obtain encoded images. The method further includes training a common classifier on the encoded images by using labeled images. The method also includes training a text encoder while keeping the common classifier in a fixed configuration by using learned text embeddings and corresponding labels for the learned text embeddings. The text encoder is further trained to match a distance of predicted text embeddings which is encoded by the text encoder to a fitted Gaussian distribution on the encoded images. The matching of the distance of the predicted text embeddings to a fitted Gaussian distribution on the encoded images enforces the unlabeled images to have a soft-clustering score for each class leveraging the small amount of labeled images that leads to improved multi-modal matching performance using large amount of data.

In an embodiment, the text encoder is trained to simultaneously optimize a cross entropy with the common classifier and a KL divergence between the fitted Gaussian distribution in the image domain and the predicted text embeddings. In this way, the distribution for the latent representations in both image and text embeddings can be matched to same distribution in a class-wise fashion that enables cross-modal generations and classification.

In an embodiment, the common classifier is trained without paired data. In this way, the classifier trained on the image samples can be used to discriminate the text embeddings samples using a fixed classifier. This enables implicitly distributing the text embeddings in the latent space without using paired image and text samples that find applications in many practical use cases.

In an embodiment, the common classifier is trained using a cross-entropy loss. In this way, the common classifier can learn to discriminate the common text and image latent space representations for the similar classification task, automatically aligning the embeddings for two modalities in the same distribution in a class-wise fashion.

According to other aspects of the present invention, a computer program product is provided for learning multimodal feature matching. The computer program product includes a non-transitory computer readable storage medium having program instructions embodied therewith. The program instructions are executable by a computer to cause the computer to perform a method. The method includes training an image encoder to obtain encoded images. The method further includes training a common classifier on the encoded images by using labeled images. The method also includes training a text encoder while keeping the common classifier in a fixed configuration by using learned text embeddings and corresponding labels for the learned text embeddings. The text encoder is further trained to match a distance of predicted text embeddings which is encoded by the text encoder to a fitted Gaussian distribution on the encoded images.

According to yet other aspects of the present invention, a computer processing system is provided for learning multimodal feature matching. The computer processing system includes a memory device for storing program code. The computer processing system further includes a processor device operatively coupled to the memory device for running the program code to train an image encoder to obtain encoded images. The processor device further runs the program code to train a common classifier on the encoded images by using labeled images. The processor device also runs the program code to train a text encoder while keeping the common classifier in a fixed configuration by using learned text embeddings and corresponding labels for the learned text embeddings. The text encoder is further trained to match a distance of predicted text embeddings which is encoded by the text encoder to a fitted Gaussian distribution on the encoded images.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to learning unpaired multimodal feature matching for semi-supervised learning.

Thus, current approaches to multimodal feature matching suffer from a significant number of deficiencies as noted above.

Advantageously, embodiments of the present invention overcome the aforementioned deficiencies by first using unpaired image and text samples. The present invention uses only few labeled samples for each class in both the modalities and learns multi-modal feature learning by using a common classifier and KL-divergence based distribution learning. Therefore, even from unpaired samples, the present invention proposes to learn robust shared embeddings between two modalities using less training data that enables cross-modal tasks like generation and captioning.

Figure 1:
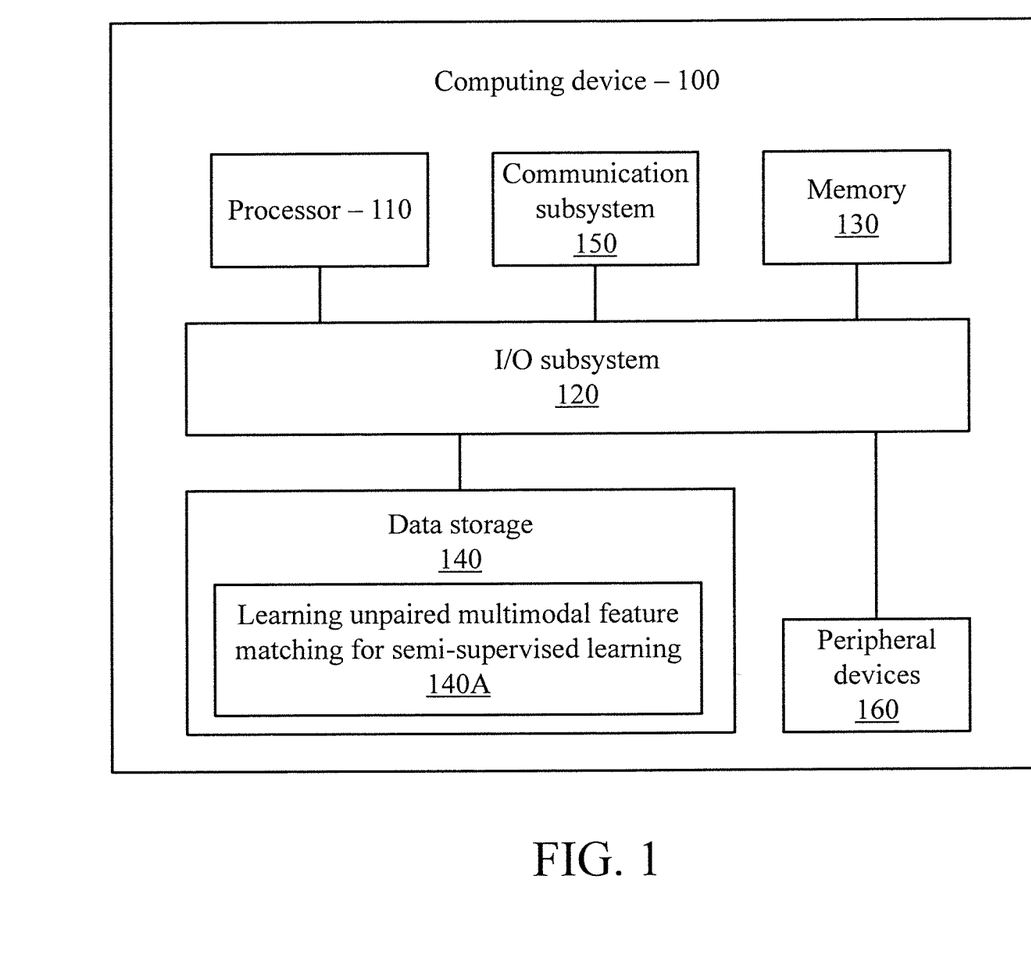
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to learn unpaired multimodal feature matching for semi-supervised learning.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for learning unpaired multimodal feature matching for semi-supervised learning. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 9-10). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention FIGS. 2 and 3 below describe methods of the present invention in different levels of detail. In particular, method 200 of FIG. 2 generally describes an embodiment of the present invention, while FIG. 3 is a further detailed description of an embodiment of the present invention. Method 200 can be considered as a general embodiment of the present invention, while method 300 can be considered a more particular embodiment of the present invention.

Figure 2:
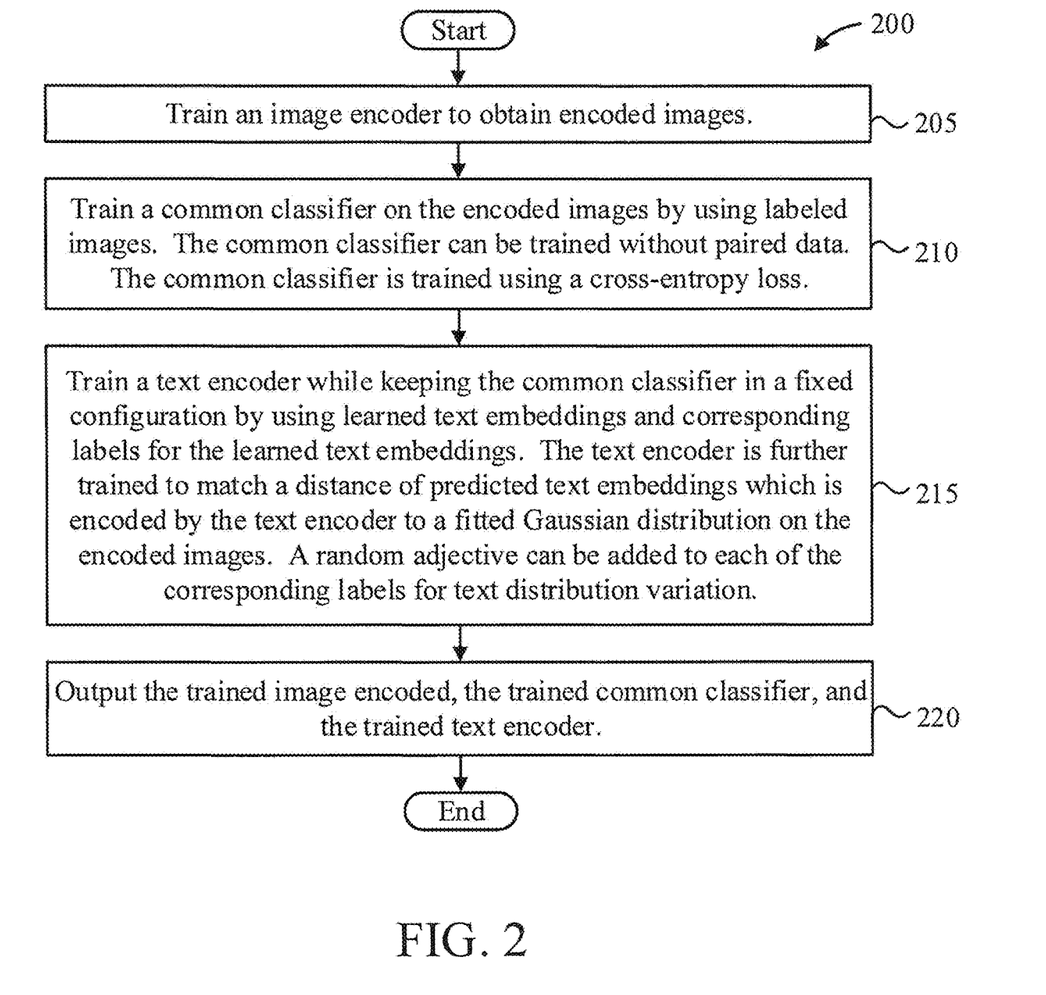
FIG. 2 is a flow diagram showing an exemplary method for learning unpaired multimodal feature matching for improved semi-supervised learning, in accordance with an embodiment of the present invention.
Figure 3:
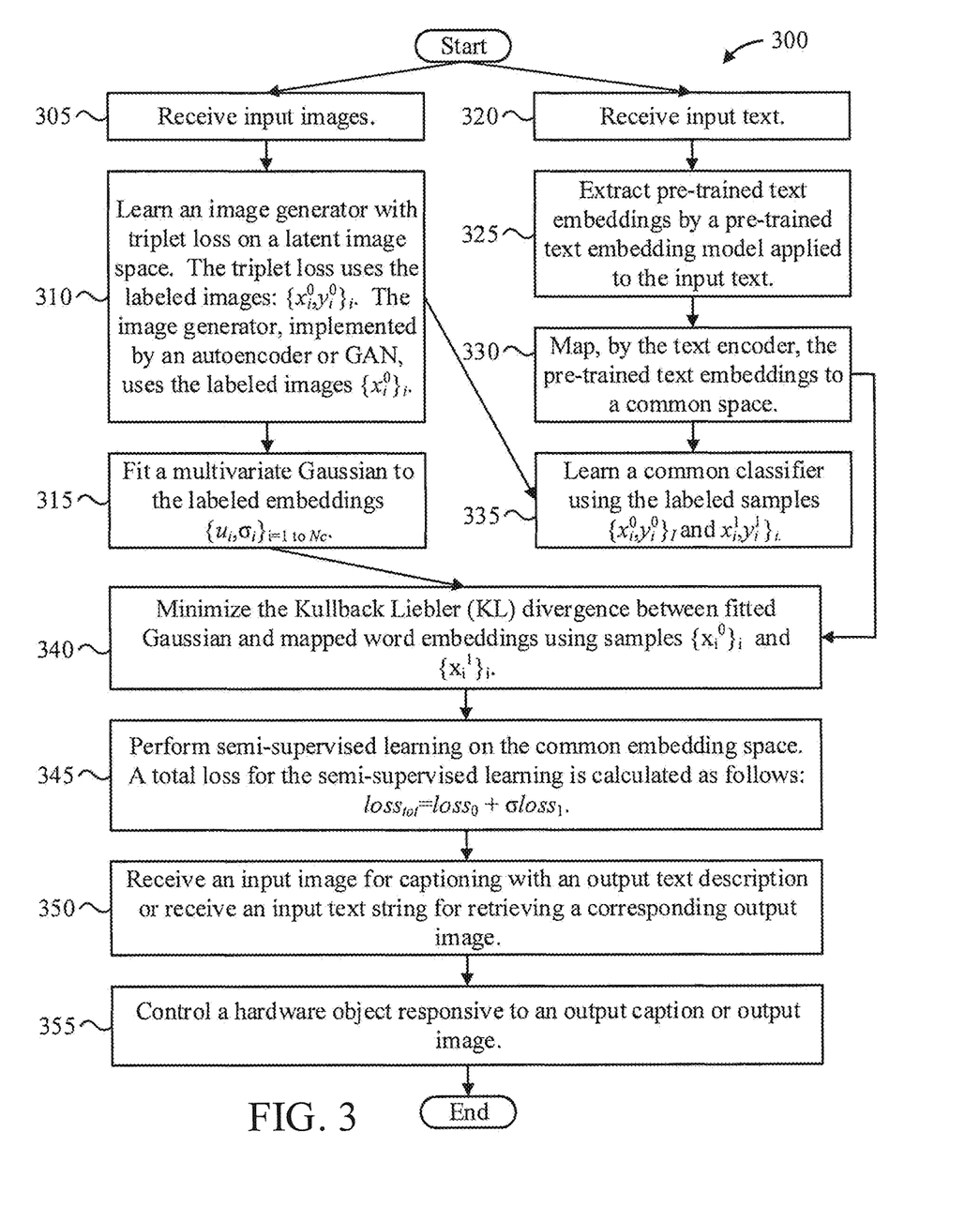
FIG. 3 is a flow diagram showing another exemplary method for learning unpaired multimodal feature matching for improved semi-supervised learning, in accordance with an embodiment of the present invention.

FIG. 2 is a flow diagram showing an exemplary method 200 for learning unpaired multimodal feature matching for improved semi-supervised learning, in accordance with an embodiment of the present invention.

At block 205, train an image encoder to obtain encoded images.

At block 210, train a common classifier on the encoded images by using labeled images. In an embodiment, the common classifier can be trained without paired data, that is, the classifier trained on the image samples can be used as a discriminator on the text samples, with fixed classifier weights, to implicitly align the latent representations of both the modalities having a similar distribution. In an embodiment, the common classifier is trained using a cross-entropy loss.

At block 215, train a text encoder while keeping the common classifier in a fixed configuration by using learned text embeddings and corresponding labels for the learned text embeddings. The text encoder is further trained to match a distance of predicted text embeddings which is encoded by the text encoder to a fitted Gaussian distribution on the encoded images. In an embodiment, a random adjective can be added to each of the corresponding labels for text distribution variation.

At block 220, output the trained image encoded, the trained common classifier, and the trained text encoder.

FIG. 3 is a flow diagram showing another exemplary method 300 for learning unpaired multimodal feature matching for improved semi-supervised learning, in accordance with an embodiment of the present invention.

At block 305, receive input images.

At block 310, learn an image generator with triplet loss on a latent image space. The triplet loss uses the labeled images: $\{x_i^0, y_i^0\}_i$. The image generator, implemented by an auto-encoder or GAN, uses the labeled images $\{x_i^0\}_i$.

At block 315, fit a multivariate Gaussian to the labeled embeddings $\{u_i, \sigma_i\}_{i=1 \text{ to } N_c}$.

At block 320, receive input text.

At block 325, extract pre-trained text embeddings by a pre-trained text embedding model applied to the input text. That is, transform the input text to representative numerical vectors using a pre-trained text embedding model.

At block 330, map, by the text encoder, the pre-trained text embeddings to a common space. The term "common space" refers to a space where image and text samples co-exist.

At block 335, learn a common classifier using the labeled samples $\{x_i^0, y_i^0\}_i$ and $\{x_i^1, y_i^1\}_i$. In an embodiment, block 335 (i.e., the learning of the common classifier) can relate to a $loss_0$.

At block 340, minimize the Kullback Liebler (KL) divergence between fitted Gaussian and mapped word embeddings using samples $\{x_i^0\}_i$ and $\{x_i^1\}_i$. In an embodiment, block 340 (i.e., minimizing the KL divergence) can relate to a loss$_1$.

At block 345, perform semi-supervised learning on the common embedding space. A total loss for the semi-supervised learning is calculated as follows:

loss$_{tot}$=loss$_0$+αloss$_1$.

Learning is performed by: block 310 (image generator+triplet loss)→block 335 (common classifier)→block 330 (text encoder).

At block 350, receive an input image for captioning with an output text description or receive an input text string for retrieving a corresponding output image.

At block 355, control a hardware object (e.g., a vehicle such as a car, etc.) responsive to an output caption or output image. For example, responsive to a label derived for an image that indicates an impending collision, the control can be of the steering, braking, or accelerating of the vehicle.

In an embodiment, the method is performed by a text captioning system that captions input images with output text descriptions. Other exemplary applications to which the present invention can be applied include but are not limited to, image captioning or image generation from small data, that can be applied in commercial systems for image retrieval, recommendation systems, etc.

Figure 4:
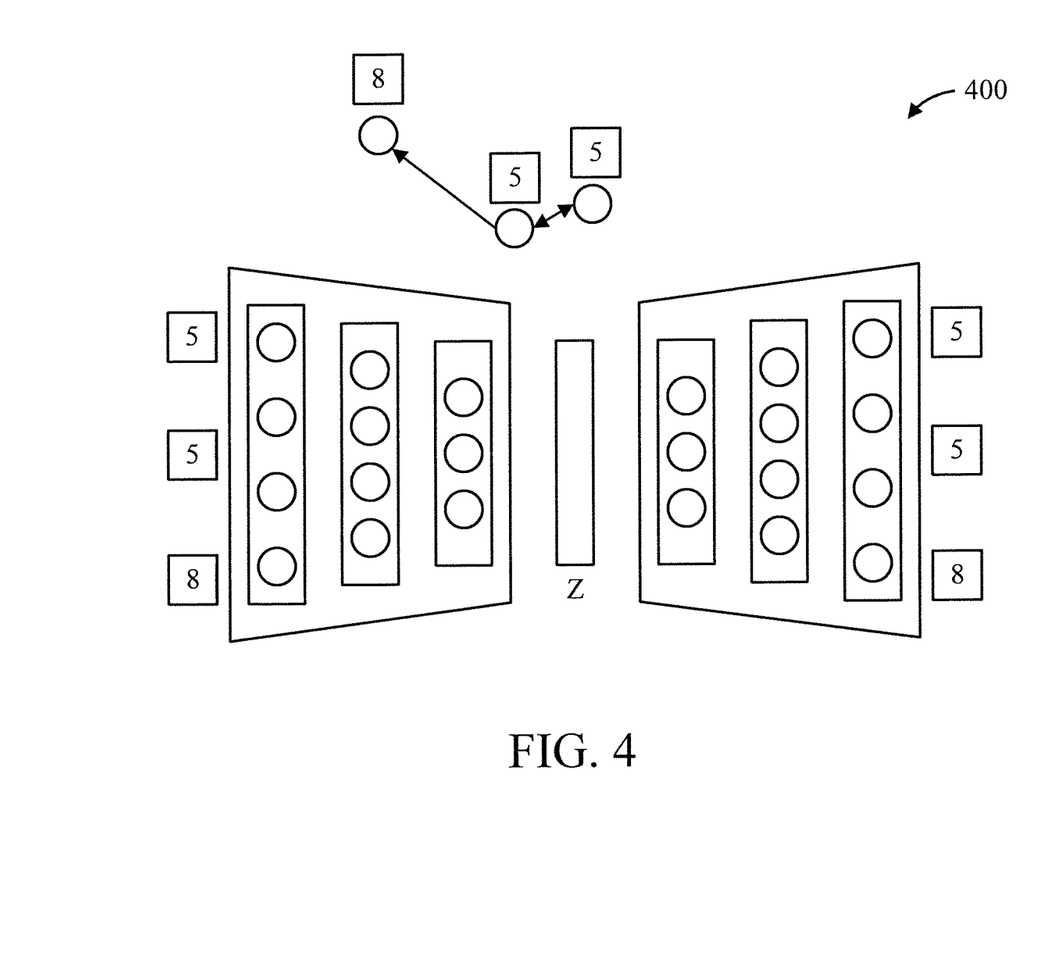
FIG. 4 is a block diagram showing an exemplary scenario involving an image generator with triplet loss, in accordance with an embodiment of the present invention.

FIG. 4 is a block diagram showing an exemplary scenario 400 involving an image generator with triplet loss, in accordance with an embodiment of the present invention.

The triplet loss bring similar image together and pushes away different images. Notice the essentially equal spacing on the left of both 5's and the 8, while on the right the 5's are spaced closed together than to the 8.

Figure 5:
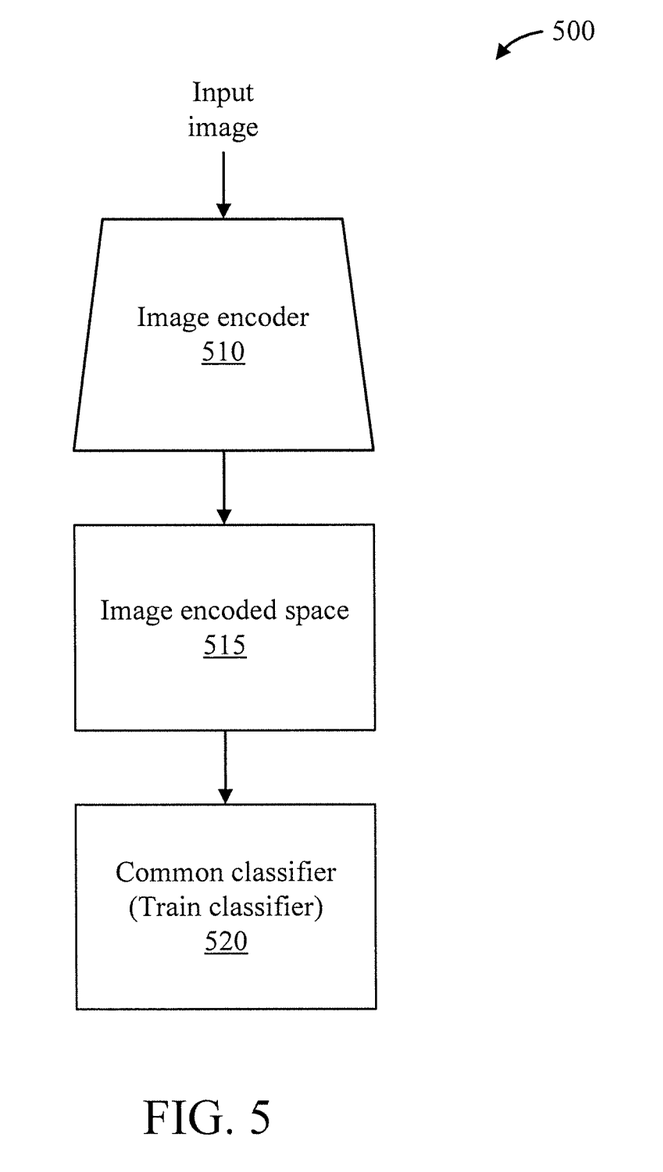
FIG. 5 is a block diagram graphically showing a portion of a block of a method of FIG. 3, in accordance with an embodiment of the present invention.

FIG. 5 is a block diagram graphically showing a portion of block 335 of method 300 of FIG. 3, in accordance with an embodiment of the present invention.

This is the image encoder training step corresponding to after the input image is passed through an encoder 510 and decoder (common classifier) 520, where the decoder 520 implements a triplet loss that "pushes" similar classes together and different classes apart.

Once the image encoder $f_{im}(.)$ 510 is trained, a classifier $d_{im}(.)$ 520 is then trained on the encoded image output to obtain the classification on the image encoded space 515. A classifier model $d_{im}(x; \theta)$ can be trained by the following cross-entropy loss:

Loss=$L_{bce}(d_{im}(f(x);\theta),y)$

Figure 6:
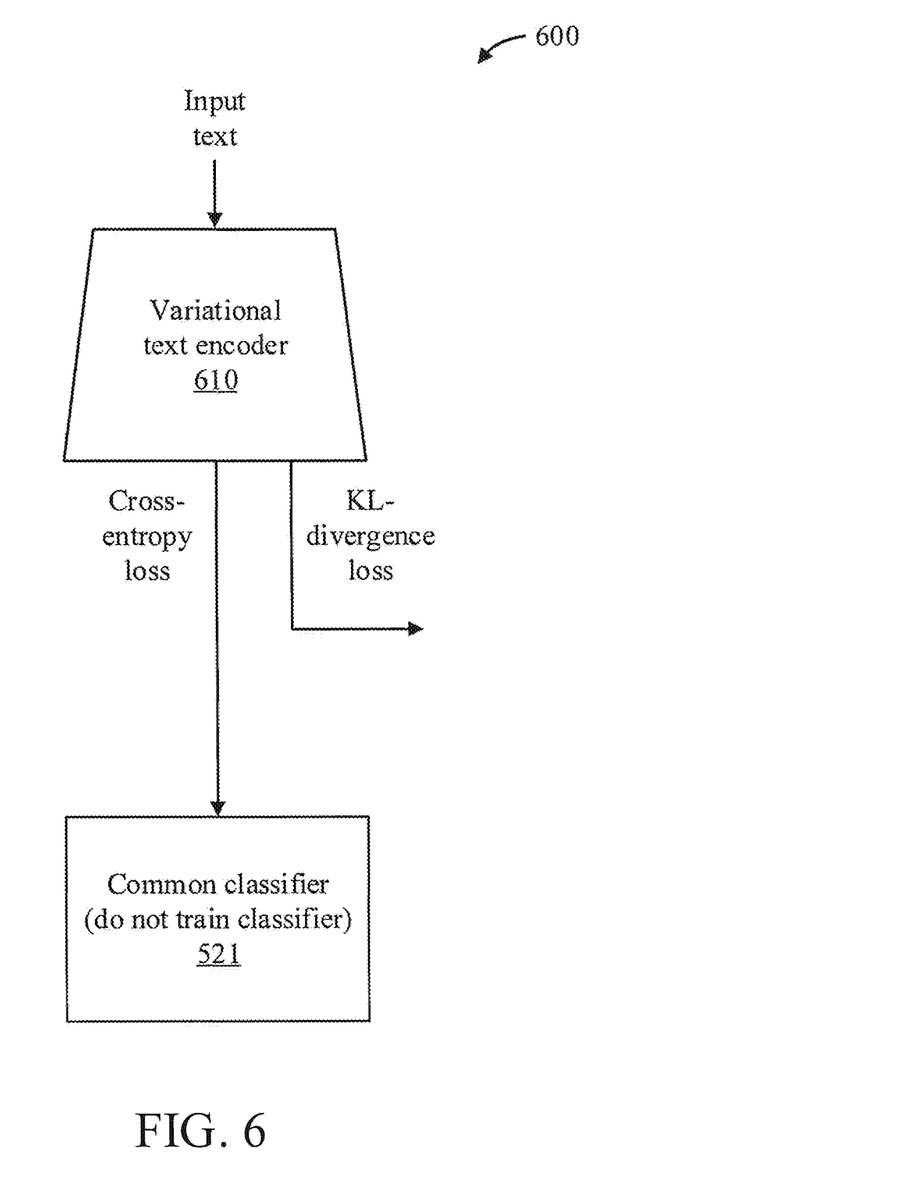
FIG. 6 is a block diagram graphically showing another portion of a block of the method of FIG. 3, in accordance with an embodiment of the present invention.

FIG. 6 is a block diagram graphically showing another portion of block 335 of method 300 of FIG. 3, in accordance with an embodiment of the present invention.

This is the text encoder training step where the input text after converting to text embeddings, are mapped to clusters using the classifier that classifies various kinds of the classes.

Note that the decoder (common classifier) 520 is fixed similar to the GAN architecture. Only the text encoder 610 is trained with Cross Entropy (CE) loss, while the decoder 520 is not trained (is fixed).

If $x_w$ is the input word and $g_w(.)$ is the embedding function (like word2vec or Glove), and $d_w(.)$ is the frozen classifier (decoder) 520, then an encoder model $f_w(g_w(x); \theta)$ is trained by the following CE loss:

Loss=$L_{bce}(d_w(f_w(g_w(x);\theta)),y)$

Figure 7:
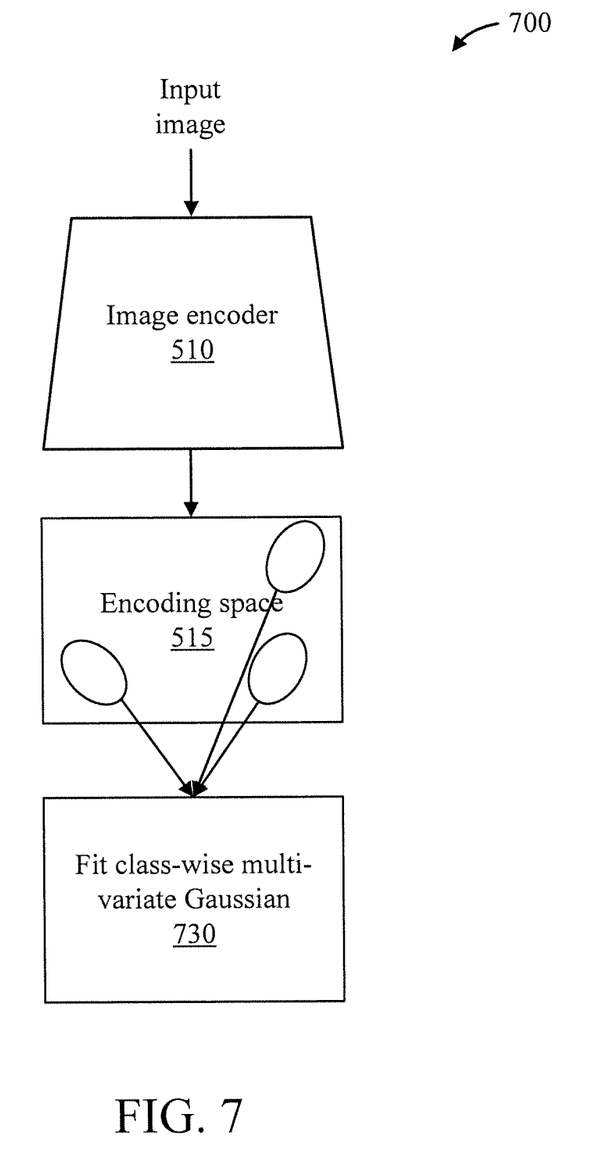
FIG. 7 is a block diagram graphically showing yet another portion of a block of the method of FIG. 3, in accordance with an embodiment of the present invention.

FIG. 7 is a block diagram graphically showing yet another portion of block 335 of method 300 of FIG. 3, in accordance with an embodiment of the present invention.

The text encoder 510 is trained to correctly classify the learned text embedding with the image classifier (fixed weights) 520 and also match the distance of the predicted text embeddings to the fitted gaussian distribution 730 using the following:

$$\underset{\alpha}{\text{Min}} - \sum_n \log p(y_n \mid g_a(\phi_b(x_n^b; \alpha))) + \lambda \frac{|\phi_b(x_n^b; \alpha) - \mu_c|_2^2}{2\sigma_c^2}$$

The preceding involves three sets of terms. The first set of terms $$\underset{\alpha}{(\text{min})}$$

corresponds to the minimum Gaussian distribution. The second set of terms $$\left(\sum_n \log p(y_n \mid g_a(\phi_b(x_n^b; \alpha)))\right)$$

corresponds to the cross-entropy loss with fixed classifier. The third set of terms $$\left(\sum_n \log p(y_n \mid g_a(\phi_b(x_n^b; \alpha)))\right)$$

corresponds to fitting the multi-variate Gaussian loss. Both losses (for the second and third set of terms) are optimized simultaneously.

Figure 8:
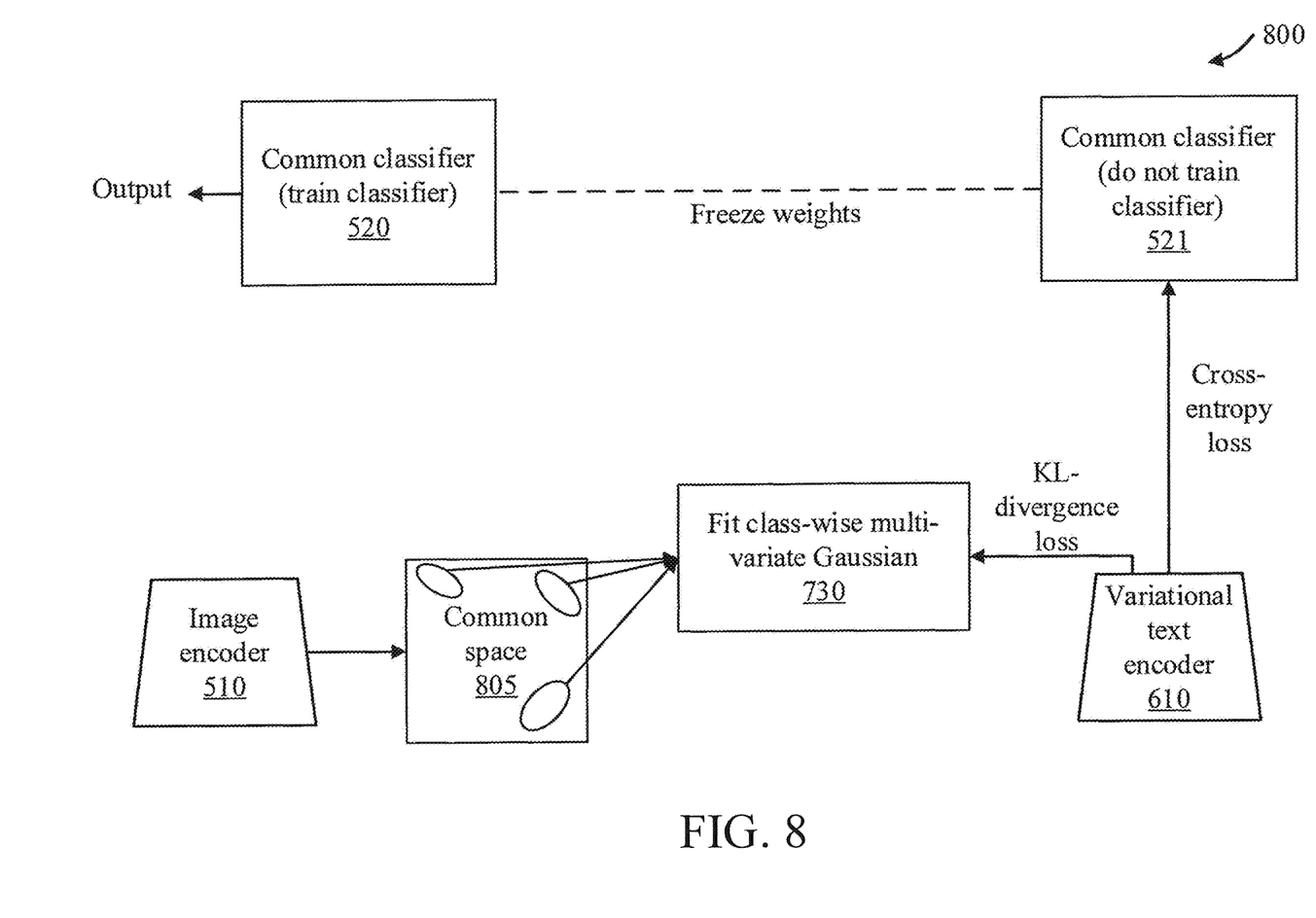
FIG. 8 is a high-level block diagram showing an exemplary learning of the overall text encoder with common classifier, in accordance with an embodiment of the present invention.

FIG. 8 is a high-level block diagram showing an exemplary learning 800 of the overall text encoder with common classifier, in accordance with an embodiment of the present invention.

In FIG. 8, image encoder 510 learns a latent representation (or embedding) for the image samples which is a part of the Common Latent Space 805 using triplet loss on the small labeled samples. Next, the common classifier 520 is trained on the image embeddings to classify samples for each class. Following that, the image embeddings for each class are fitted in a class-wise multi-variate Gaussian distribution 730. Finally, the Variational Text Encoder 610 is trained on the frozen weight version of the common classifier using cross-loss and additionally trained using the KL-divergence loss for fitting the class-wise multi-variate Gaussian distribution.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
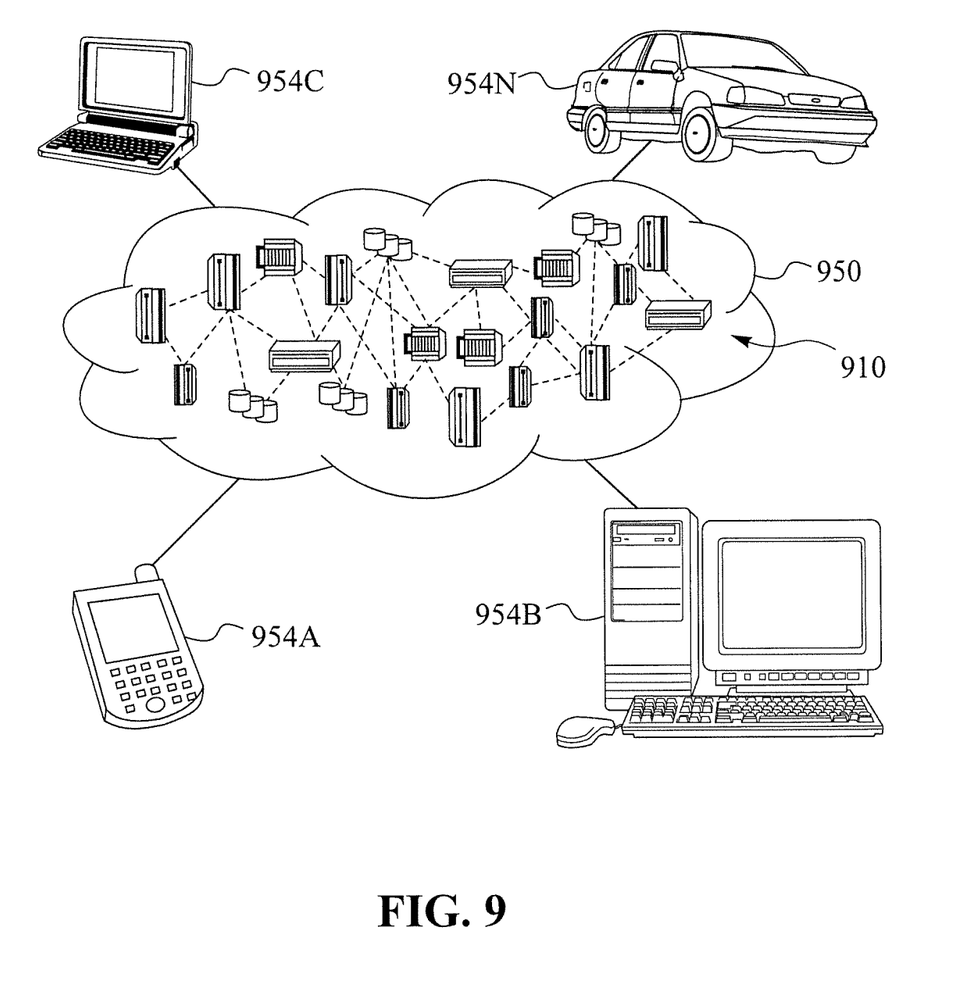
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
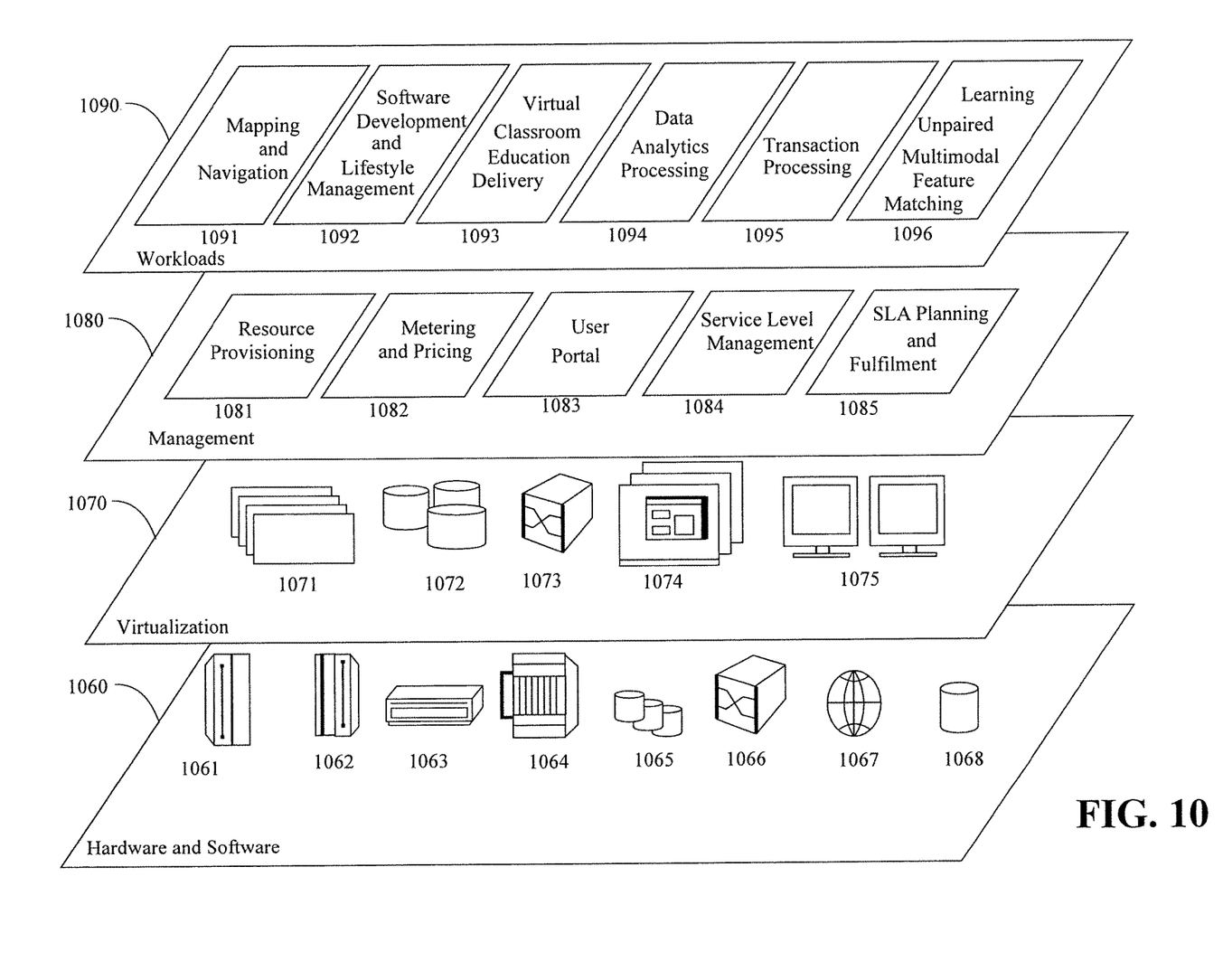
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and learning unpaired multimodal feature matching for semi-supervised learning 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for learning multimodal feature matching comprising:
training an image encoder with a triplet loss that pushes similar images together and dissimilar images apart to obtain encoded images;
training a common classifier on the encoded images by using labeled images to learn text embeddings with corresponding labels; and
training a text encoder while keeping the common classifier in a fixed configuration by using learned text embeddings and corresponding labels for the learned text embeddings, wherein the text encoder is further trained to match a distance of predicted text embeddings which is encoded by the text encoder to a fitted Gaussian distribution on the encoded images.

2. The computer-implemented method of claim 1, further comprising training the common classifier by using the labeled images with the image encoder and labeled text with the text encoder.

3. The computer-implemented method of claim 1, wherein the text encoder is trained to simultaneously optimize a cross entropy with the common classifier and a KL divergence between the fitted Gaussian distribution and the predicted text embeddings.

4. The computer-implemented method of claim 1, wherein the common classifier is trained without paired data.

5. The computer-implemented method of claim 1, wherein the common classifier is trained using a cross-entropy loss.

6. The computer-implemented method of claim 1, wherein a total loss is computed as a sum of a loss corresponding to the common classifier and a result of multiplying a hyperparameter by a loss corresponding to the image encoder.

7. The computer-implemented method of claim 1, further comprising minimizing a Kullback-Liebler divergence between the fitted Gaussian distribution and the learned text embeddings with the corresponding labels.

8. The computer-implemented method of claim 7, further comprising performing semi-supervised learning on a common embedding space.

9. The computer-implemented method of claim 1, wherein the text encoder maps pre-trained text embeddings to a common latent representation together with the image embeddings to enable cross-modal tasks.

10. The computer-implemented method of claim 1, further comprising extracting the text embeddings by a pre-trained text embedding model applied to training text.

11. The computer-implemented method of claim 1, wherein the method is performed by a text captioning system that captions input images with output text descriptions.

12. The computer-implemented method of claim 11, further comprising controlling an automobile for collision avoidance, responsive to at least one of the output text descriptions indicating an impending collision.

13. The computer-implemented method of claim 1, wherein the triplet loss pushes similar ones of the encoded images together and dissimilar ones of the encoded images apart.

14. The computer-implemented method of claim 1, wherein training the text encoder further comprises mapping, using the common classifier, the learned text embeddings to sample clusters to classify the learned text embeddings into respective ones of a plurality of classes.

15. The computer-implemented method of claim 1, wherein the text encoder is trained such that a cross-entropy loss with a classifier in the fixed configuration and multivariate Gaussian loss are simultaneously optimized.

16. The computer-implemented method of claim 1, further comprising adding a random adjective to each of the corresponding labels for text distribution variation.

17. A computer program product for learning multimodal feature matching, the computer program product comprising a non-transitory computer readable storage medium having program instructions embodied therewith, the program instructions executable by a computer to cause the computer to perform a method comprising:

training an image encoder with a triplet loss that pushes similar images together and dissimilar images apart to obtain encoded images;

training a common classifier on the encoded images by using labeled images to learn text embeddings with corresponding labels; and training a text encoder while keeping the common classifier in a fixed configuration by using learned text embeddings and corresponding labels for the learned text embeddings, wherein the text encoder is further trained to match a distance of predicted text embeddings which is encoded by the text encoder to a fitted Gaussian distribution on the encoded images.

18. The computer program product of claim 17, wherein the method further comprises training the common classifier by using the labeled images with the image encoder and labeled text with the text encoder.

19. The computer program product of claim 17, wherein the text encoder is trained to simultaneously optimize a cross entropy with the common classifier and a KL divergence between the fitted Gaussian distribution and the predicted text embeddings.

20. The computer program product of claim 17, wherein the common classifier is trained without paired data.

21. The computer program product of claim 17, wherein the common classifier is trained using a cross-entropy loss.

22. The computer program product of claim 17, wherein a total loss is computed as a sum of a loss corresponding to the common classifier and a result of multiplying a hyperparameter by a loss corresponding to the image encoder.

23. The computer program product of claim 17, wherein the method further comprises minimizing a Kullback-Liebler divergence between the fitted Gaussian distribution and the learned text embeddings with the corresponding labels.

24. The computer program product of claim 17, wherein the method is performed by a text captioning system that captions input images with output text descriptions.

25. A computer processing system for learning multimodal feature matching, the computer processing system comprising:

a memory device for storing program code; and a processor device operatively coupled to the memory device for running the program code to train an image encoder with a triplet loss that pushes similar images together and dissimilar images apart to obtain encoded images;

train a common classifier on the encoded images by using labeled images to learn text embeddings with corresponding labels; and train a text encoder while keeping the common classifier in a fixed configuration by using learned text embeddings and corresponding labels for the learned text embeddings, wherein the text encoder is further trained to match a distance of predicted text embeddings which is encoded by the text encoder to a fitted Gaussian distribution on the encoded images.

* * * * *